(12) United States Patent
Carper (10) Patent No.: US 8,713,660 B2
(45) Date of Patent: Apr. 29, 2014

(54) AUTHENTICATION PLATFORM AND RELATED METHOD OF OPERATION

(75) Inventor: Todd Alan Carper, Burlingame, CA (US)

(73) Assignee: TEC Solutions, Inc., Burlingame, CA (US)

( * ) Notice: Subject to any disclaimer, the term of this patent is extended or adjusted under 35 U.S.C. 154(b) by 190 days.

(21) Appl. No.: 13/108,146

(22) Filed: May 16, 2011

(65) Prior Publication Data

US 2012/0297467 A1    Nov. 22, 2012

(51) Int. Cl.
*H04L 29/06* (2006.01)

(52) U.S. Cl.
USPC .............................................. 726/9; 713/185

(58) Field of Classification Search
None
See application file for complete search history.

(56) References Cited

U.S. PATENT DOCUMENTS 7,506,821 B2 *   3/2009   Brown et al. ................. 235/492
7,946,502 B2 *   5/2011   Faith et al. .................... 235/492

* cited by examiner

*Primary Examiner* — Gilberto Barron, Jr.
*Assistant Examiner* — Simon Kanaan
(74) *Attorney, Agent, or Firm* — Volentine & Whitt, PLLC (57) ABSTRACT

An authentication platform comprises an authentication unit configured to authenticate the user based on received input data, and a control unit configured to enable communication between a client device and an authentication host as a consequence of successful authentication of the user by the authentication unit.

16 Claims, 10 Drawing Sheets

AUTHENTICATION PLATFORM AND RELATED METHOD OF OPERATION

BACKGROUND

The disclosed embodiments relate generally to authentication technologies. More particularly, the disclosed embodiments relate to authentication platforms and methods that can be used to add one or more authentication mechanisms to an existing authentication system.

Authentication systems are commonly used to regulate access to secured entities such as confidential data, private real estate or equipment, personal electronic devices, and so on. An authentication system generally requires a user to present some form of authenticating information, such as a pass code, a personal token, or biometric data. The system then verifies the received information, e.g., by comparing it with stored data, and authenticates the user upon successful verification.

To provide enhanced security, some authentication systems require a user to present multiple types of authenticating information. These systems are often referred to as multi-factor authentication systems. In one common example, an automatic teller machine (ATM) requires a user to provide both a personal token in the form of a magnetized bank card, and a pass code in the form of a personal identification number (PIN). Some systems may further require the user to provide a third type of authenticating information, such as a fingerprint.

Notwithstanding current security measures, many authentication systems are susceptible to breach due to persistent and increasingly sophisticated threats from hackers, thieves, and others. Moreover, these threats tend to adapt to current technologies, making it difficult to maintain a consistent level of security with the same authentication system. Accordingly, most authentication systems are updated periodically to keep pace with evolving threats.

Unfortunately, such updates can be expensive and tedious. For instance, they may require new device hardware, software upgrades, issuance of new user tokens or pass codes, and so on. Additionally, certain updates are required to comply with security regulations or standards, creating further complications. For example, changes to electronic banking security can be subject to bank security regulations and standards, which can further complicate the task of maintaining updated security.

In view of these and other challenges, authentication systems continue to be an area of active research and development.

SUMMARY

Embodiments of the inventive concept provide authentication platforms and related methods that can be used to improve existing authentication systems. Certain embodiments can reduce the cost and difficulty of adding security measures to the existing systems.

According to one embodiment of the inventive concept, an authentication platform comprises an authentication unit configured to receive input data and to authenticate the user based on the input data, and a control unit configured to enable communication between a client device and an authentication host as a consequence of successful authentication of the user by the authentication unit.

According to another embodiment of the inventive concept, a method of operating an authentication system comprises receiving input data through an interface of an integrated device comprising an authentication platform and a client device, operating the authentication platform to authenticate a user according to the received input data, and to enable communication between the client device and an authentication host as a consequence of authenticating the user.

According to still another embodiment of the inventive concept, an integrated device comprises a user interface configured to receive input data, an integrated circuit storing information for authenticating a user to an authentication host and configured to communicate with the authentication host, and an authentication platform configured to capture a message generated by the integrated circuit upon powering up, to power down the integrated circuit after capturing the message, to transmit the captured message to the authentication host while the integrated circuit is powered down, to authenticate a user according to the input data, and to power up the integrated circuit and the authentication host after authenticating the user.

BRIEF DESCRIPTION OF THE DRAWINGS

The drawings illustrate selected embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are presented as teaching examples and should not be construed to limit the scope of the inventive concept.

In general, the described embodiments relate to authentication systems and related methods of operation. These authentication systems can take any of several forms designed to regulate access to a secured entity. Examples include keyless automobile entry systems, building access card systems, computer logon systems, and secured bank card systems, to name but a few.

In certain embodiments, an authentication system comprises an authentication host and an integrated device comprising a trusted client device and an authentication platform. The authentication host determines whether to authenticate a user based on information contained in the trusted client device. Upon successful authentication, the authentication host performs control operations to allow the user to access a secured entity. For instance, the authentication host can actuate a door switch to allow the user to enter a building.

The trusted client device operates under the control of the authentication platform to output authenticating information to the authentication host. The trusted client device can take a variety of forms, such as an integrated circuit in a keyless entry fob, a smartcard, a radio frequency identification (RFID) tag, and others.

The authentication platform provides an additional authentication mechanism for the authentication system. As an example, the authentication platform can require a user to enter information, such as a fingerprint or pass code, before allowing communication between the trusted client device and the authentication host.

The authentication platform can also act as a controller for the trusted client device. For instance, in an authentication operation, the authentication platform can selectively power the trusted client device, capture and manage transmissions between the trusted client device and the authentication host, and request extra time for the trusted client device to respond to communications from the authentication host.

The authentication platform can also act as a communication intermediary between the client device and the authentication host. For instance, the authentication platform can receive signals from the authentication host and transmit the received signals to the trusted client device, and receive signals from the trusted client device and transmit the received signals to the authentication host.

The authentication platform typically comprises a first interface that allows it to interact with an authentication host as if it were the trusted client device, and a second interface that allows it to interact with the trusted client device as if it were the authentication host. This allows the authentication platform to be combined with the client device and authentication host without requiring any modifications to the operation of the client device or authentication host. In other words the authentication platform can enhance the security of the authentication system with limited expense and complication.

The trusted client device and authentication platform can be combined in a single package or unit to form an integrated device. For example, the trusted client device and the authentication platform can be connected to each other on a single circuit board and included within a single fob-type or card-type device. The integrated device can also incorporate protective measures to prevent the trusted client device from being tampered with or used separately from the authentication platform. For example, the integrated device can include a mechanism for disabling or destroying the trusted client device if a user tampers with a package or disconnects the trusted client device from the authentication platform.

Figure 1:
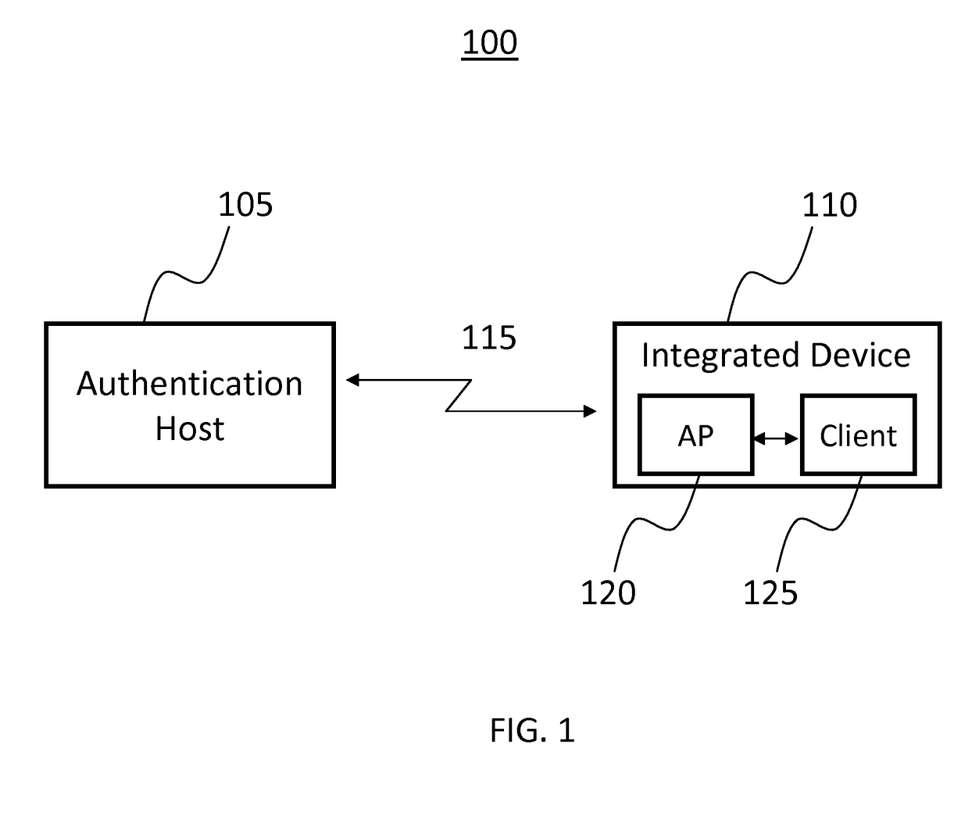
FIG. 1 is a block diagram illustrating an authentication system according to an embodiment of the inventive concept.

FIG. 1 is a block diagram illustrating an authentication system 100 according to an embodiment of the inventive concept.

Referring to FIG. 1, authentication system 100 comprises an authentication host 105 and an integrated device 110. Authentication host 105 communicates with integrated device 110 through a communication medium 115.

Authentication host 105 regulates access to a secured entity such as a locked door, a protected computer, an ATM, and so on. The location at which access is regulated will be referred to as an authentication point, and the location at which access occurs will be referred to as an access point. The access point and the authentication point can both be placed at a variety of locations, such as an entrance to a building or automobile, at a computer terminal, or on an ATM. In addition, the authentication point can be located in the same place as the access point, or at a remote location.

Authentication host 105 regulates access to the secured entity by receiving communication from a client device and determining whether the received communication indicates an authorized user. For example, the communication can include personal information identifying the user, a pass code, biometric data, or a unique identifier of an issued token.

The user's authorization status is typically determined by comparing received information against a database of user information. In certain examples, the database comprises personal information or pass codes that have been registered with the authentication host or a central registration system. The database can also comprise user identification templates to be compared with received user information to verify the user's identity. Such templates can be useful, for example, in performing biometric authentication such as face or fingerprint recognition. In general, the database can reside local to authentication host 105, or it can be stored remotely and accessed by authentication host 105 through a network.

Upon detecting an authorized user, authentication host 105 performs a control operation to grant user access. For example, authentication host 105 can send a control signal to release a lock on a door, to allow usage of a computer system, or to access the user's bank account. This control operation can be performed from a location proximate to an access point or remote from the access point.

Communication medium 115 can be any medium allowing communication between authentication host 105 and integrated device 110. For example, it can take the form of a wired or wireless digital connection.

Integrated device 110 is employed by a user to gain access to a secured entity protected by authentication host 105. Integrated device 110 comprises an authentication platform 120 and a client device 125. Authentication platform 120 and client device 125 are typically combined in a single device package or form factor. For example, in certain embodiments, they are combined in a fob-type device or a card-type device. Moreover, in certain embodiments, they can be formed on the same circuit board.

Client device 125 is a trusted device that can be recognized by authentication host 105 as being associated with an authorized user. In some embodiments, client device 125 is a legacy device associated with authentication host 105, and authentication platform 120 is added to it in order to improve security. Client device 125 can take various forms, such as an integrated circuit chip configured to store and transmit authenticating information. In some embodiments, client device 125 has a small form factor so that it can be inserted in a small portable device such as a smartcard, a keychain fob, or a universal serial bus (USB) stick.

Client device 125 is typically designed to communicate directly with authentication host 105. In such communications, client device 125 provides information to identify the user to authentication host 105. In authentication system 100, however, certain communications between client device 125 and authentication host 105 are intercepted by authentication platform 120. Accordingly, client device 125 communicates indirectly with authentication host 105 through authentication platform 120.

Authentication platform 120 provides an additional authentication mechanism for authentication system 100. In addition, authentication platform 120 controls certain operations of client device 125 to ensure that a user is only authenticated to authentication host 105 if the additional authentication mechanism is satisfied.

Authentication platform 120 also serves as a communication intermediary between authentication host 105 and client device 125. In particular, authentication platform 120 captures certain communications from client device 125 and transmits the captured communications to authentication host 105. In addition, authentication platform 120 captures certain communications from authentication host 105 and transmits the captured communications to client device 125.

Authentication platform 120 poses as client device 125 when communicating with authentication host 105 and poses as authentication host 105 when communicating with client device 125. As a result, authentication platform 120 can be integrated into an existing authentication system without requiring changes to the existing functions of authentication host 105 and client device 125. This can be an effective way of improving the security of an existing authentication system at a relatively low cost because it allows existing infrastructure to remain in place, such as authentication host 105 and any related control mechanisms and databases. In addition, it allows existing components, such as client device 125, to be reused.

Figure 2:
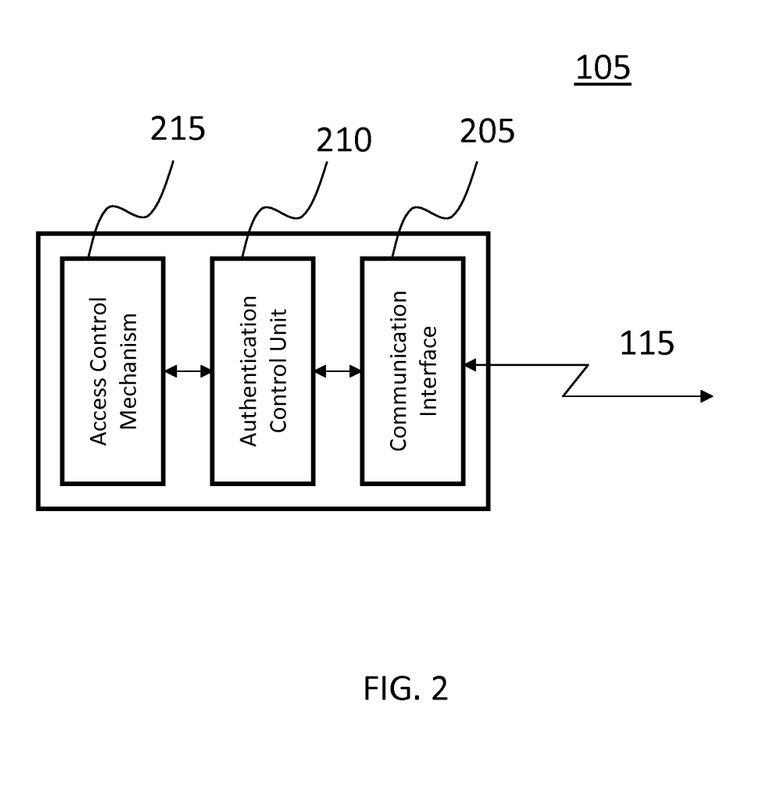
FIG. 2 is a block diagram illustrating an example of an authentication host shown in FIG. 1 according to an embodiment of the inventive concept.

FIG. 2 is a block diagram illustrating an example of authentication host 105 shown in FIG. 1 according to an embodiment of the inventive concept.

Referring to FIG. 2, authentication host 105 comprises a communication interface 205, an authentication control unit 210, and an access control mechanism 215.

Communication interface 205 is configured to communicate with integrated device 110 via communication medium 115. In some embodiments, communication interface 205 implements a standard wireless or wired communication protocol. Moreover, in some embodiments, communication interface 205 communicates with integrated device 110 through a network or other intermediate technology.

Authentication control unit 210 determines an authentication status of a user based on information received from integrated device 110 through communication interface 205. This can be accomplished, for instance, by comparing the received information with stored records or templates in a database, or by analyzing the information to determine whether it meets one or more predetermined criteria. In certain embodiments, a user is authenticated based on information received in a prior registration process. Upon recognizing an authorized user, authentication control unit 210 communicates with access control mechanism 215 to indicate successful authentication.

Access control mechanism 215 regulates access to a secured entity. This can be accomplished, for instance, by transmitting a control signal to an access control mechanism such as a lock, switch, or software access module, or to another access control device or system.

Figure 3:
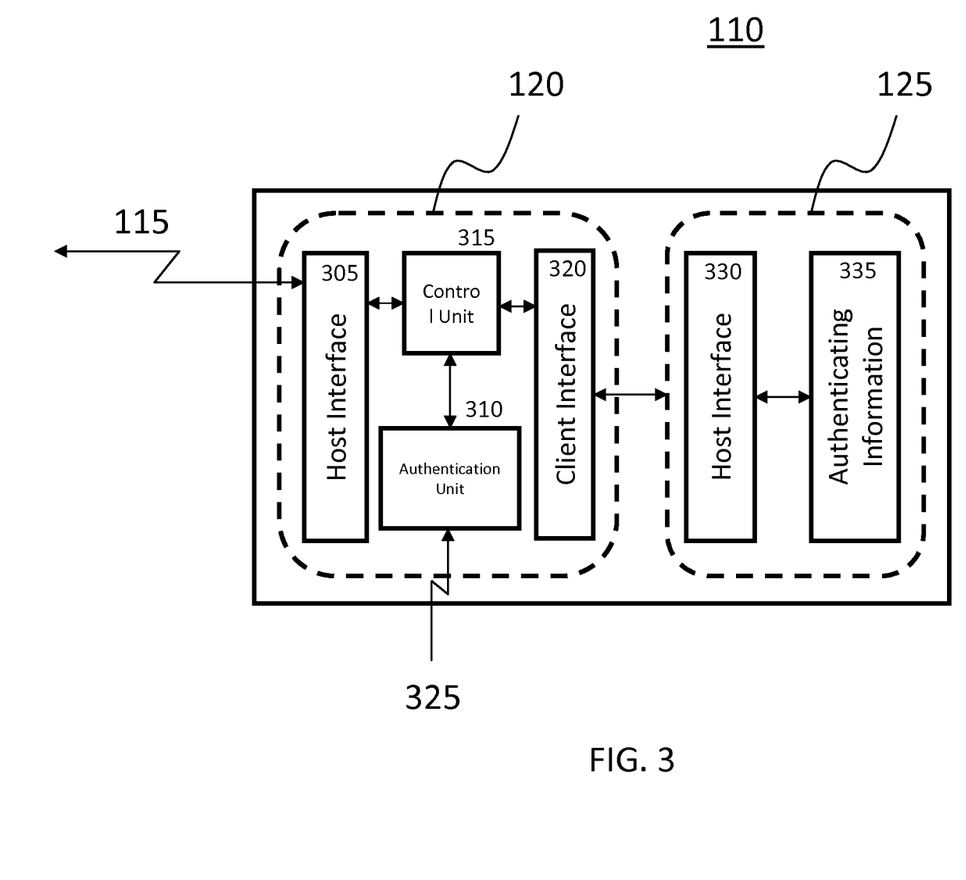
FIG. 3 is a block diagram illustrating an example of an integrated device shown in FIG. 1 according to an embodiment of the inventive concept.

FIG. 3 is a block diagram illustrating an example of integrated device 110 of FIG. 1 according to an embodiment of the inventive concept.

Referring to FIG. 3, authentication platform 120 and client device 125 are formed on the same circuit board. Authentication platform 120 comprises a host interface 305, an authentication unit 310, a control unit 315, and a client interface 320. Client device 125 comprises a host interface 330 and authenticating information 335.

Host Interface 305 facilitates communication between authentication platform 120 and authentication host 105. Host interface 305 typically communicates using the same protocol as host interface 330 of client device 125. This enables authentication platform 120 to pose as client device 125 when communicating with authentication host 105.

Authentication unit 310 receives user input 325 in order to perform a supplemental authentication mechanism. User input 325 can be, for example, biometric data, a PIN, a motion such as a gesture, a pressure reading, or a button sequence, to name but a few. User input 325 can also include a combination of different types of inputs. Authentication unit 310 compares the user input with stored information to determine whether to authenticate the user. Upon authenticating a user, authentication unit 310 communicates with control unit 315 to control subsequent operations of authentication platform 120 and client device 125. These subsequent operations can include, for instance, communication between client device 125 and authentication host 105.

Control unit 315 controls operations of authentication platform 120, such as communication with authentication host 105 and client device 125. Control unit 315 also controls certain operations of client device 125, such as powering up and communicating with authentication host 105.

Client interface 320 facilitates communication between authentication platform 120 and client device 125. Client interface 320 typically communicates using the same protocol as authentication host 105. This enables authentication platform 120 to pose as authentication host 105 when communicating with client device 125.

Host interface 330 allows client device 125 to communicate with authentication platform 120. Authenticating information 335 is used to authenticate client device 125 to authentication host 105.

Figure 4:
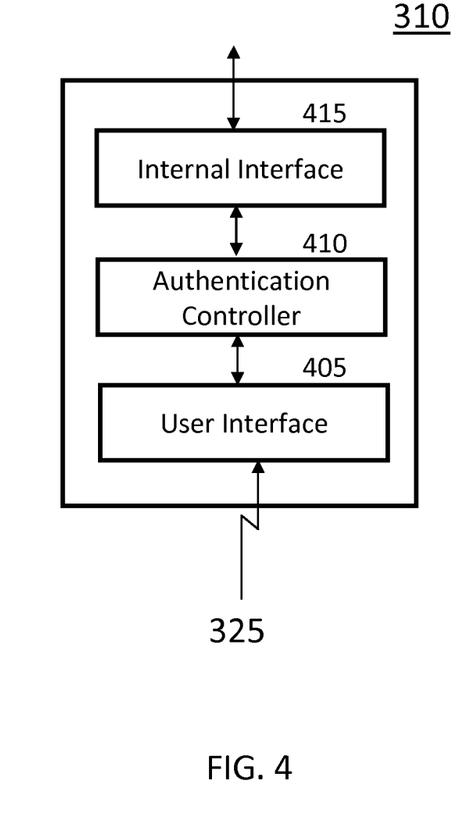
FIG. 4 is a block diagram illustrating an example of an authentication unit in the integrated device of FIG. 3 according to an embodiment of the inventive concept.

FIG. 4 is a block diagram illustrating an example of authentication unit 310 of FIG. 3 according to an embodiment of the inventive concept.

Referring to FIG. 4, authentication unit 310 comprises a user interface 405, an authentication controller 410, and an internal interface 415.

User interface 405 receives user input 325 for authentication unit 310. User interface 405 can comprise, for instance, a key pad, a fingerprint scanner, a camera, a pressure or motion sensor, or another data capture device. User interface 405 can also include a display for presenting information to a user.

Authentication controller 410 receives user input 325 from user interface 405 and analyzes it to determine whether the authentication mechanism of authentication unit 310 is satisfied. This is typically accomplished by comparing the user input with stored data. The stored data is typically contained within integrated device 110, and it generally relates to one or more users associated with integrated device 110. The stored data can also be contained separate from integrated device 110, for instance, in a network storage device that can be accessed remotely by integrated device 110.

Internal interface 415 is used for communication between authentication unit 310 and control unit 315. For instance, internal interface 415 can transfer control signals to control unit 315 to indicate that the authentication mechanism of authentication unit 310 has been satisfied.

Figure 5:
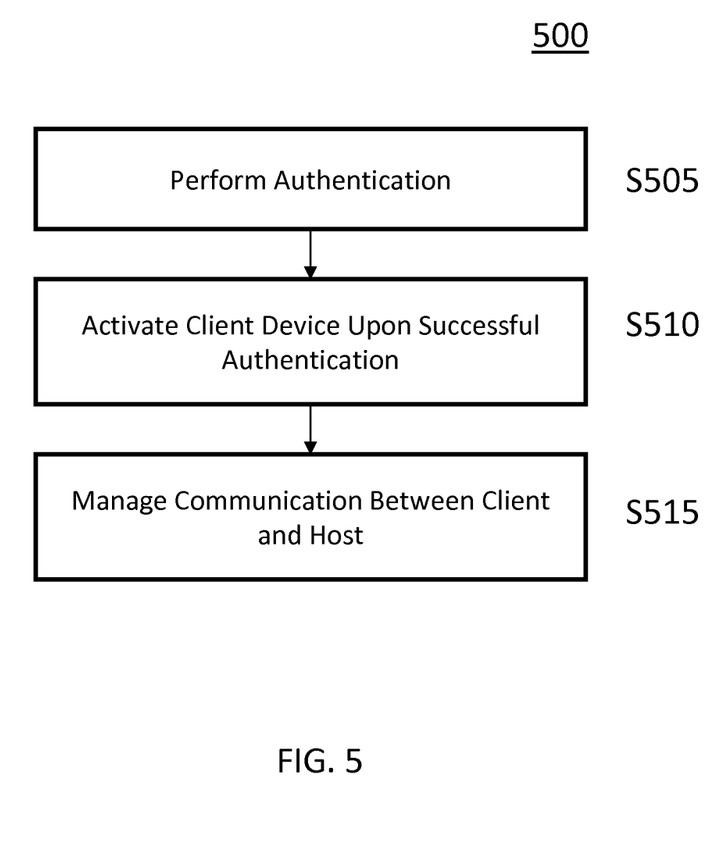
FIG. 5 is a flowchart illustrating a method of operating an authentication platform according to an embodiment of the inventive concept.

FIG. 5 is a flowchart illustrating a method 500 for operating an authentication platform according to an embodiment of the inventive concept. The method of FIG. 5 will be described with reference to authentication system 100 of FIGS. 1 through 4, but it can be used with other system configurations.

In the description that follows, example method steps will be indicated by parentheses (SXXX) to distinguish them from example system or device features.

Referring to FIG. 5, authentication platform 120 first performs the additional authentication mechanism according to user input 325 provided to authentication unit 310 (S505). Upon successful authentication, authentication unit 310 communicates with control unit 315 to activate client device 125 (S510). Client device 125 can be activated, for instance, by performing a power up operation or enabling communication between client device 125 and authentication host 105.

Following activation of client device 125, authentication platform 120 manages communication between client device 125 and authentication host 105 (S515). The monitoring can comprise, for instance, receiving outgoing transmissions from client device 125 and transmitting them to authentication host 105, and receiving outgoing transmissions from authentication host 105 and transmitting them to client device 125. The monitoring can also comprise enabling direct communication between client device 125 and authentication host 105.

Figure 6:
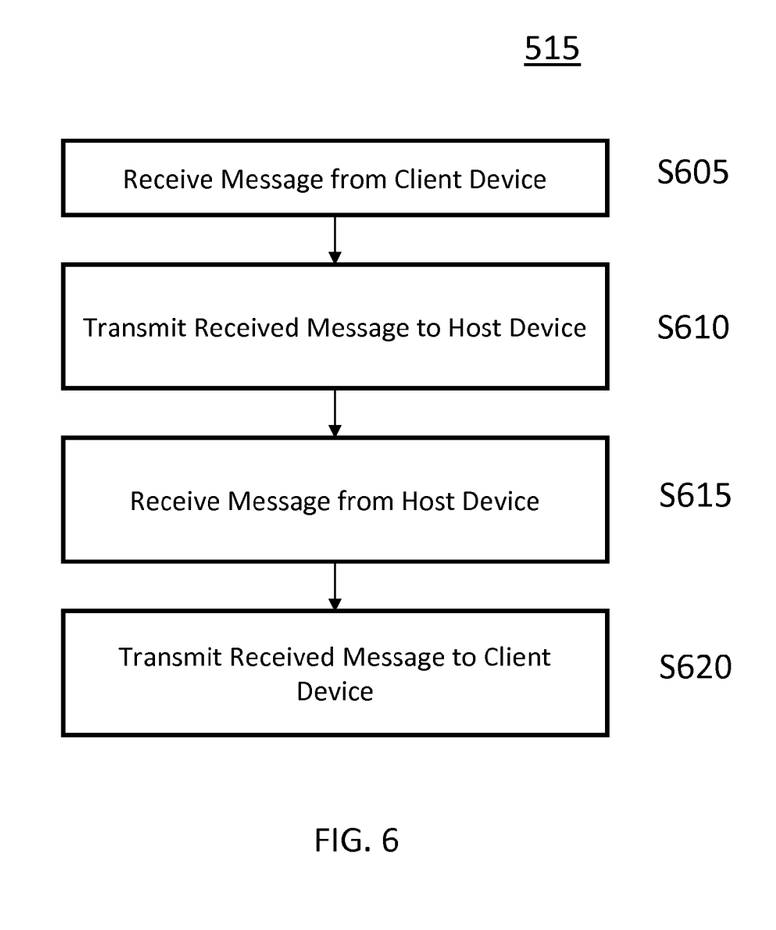
FIG. 6 is a flowchart illustrating a method of operating an authentication platform to manage communication between a client device and an authentication host according to an embodiment of the inventive concept.

FIG. 6 is a flowchart illustrating a method of operating an authentication platform to manage communication between a client device and an authentication host according to an embodiment of the inventive concept. The method of FIG. 6 is an example of step S515 of FIG. 5. The method will be described with reference to authentication system 100 of FIGS. 1 through 4, but it can be used with other system configurations.

Referring to FIG. 6, authentication platform 120 receives a message from client device 125 (S605). The message can include any type of information used to communicate with authentication host 105. For instance, it can include information used to establish an initial connection with authentication host 105, or to authenticate client device 125. In some embodiments, the message is generated by client device 125 upon powering up. In some embodiments, the message is stored in authentication platform 120 for subsequent transmission to authentication host 105.

Next, authentication platform 120 transmits the received message to authentication host 105 (S610). This transmission is typically made with the same protocol used by client device 125 when communicating directly with authentication host 105. By using the same protocol as client device 125, authentication platform 120 can be inserted into authentication system 100 without requiring changes to client device 125 or authentication host 105.

Following the transmission, authentication platform 120 receives a message from authentication host 105 (S615). The message can include type of information used in an authentication process of client device 125. In some embodiments, authentication platform 120 stores the message for subsequent transmission to client device 125.

Finally, authentication platform 120 transmits the received message to client device 125 (S620). The message is transmitted with the same protocol used by authentication host 105 to communicate with client device 125. Accordingly, client device 125 can be made to behave as if it were communicating directly with authentication host 105 rather than with authentication platform 120.

Figure 7:
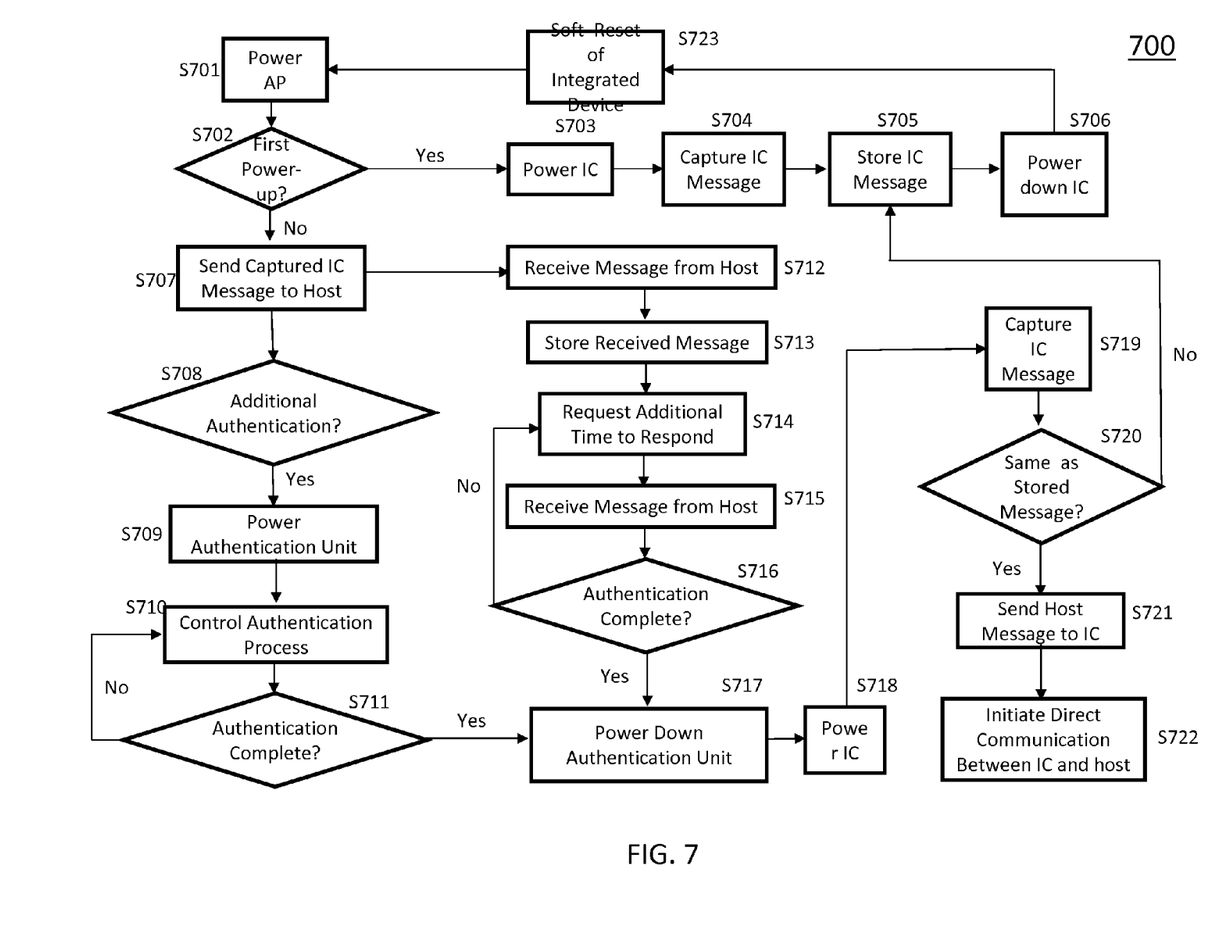
FIG. 7 is a flowchart illustrating a method of operating an authentication platform to authenticate a user to an authentication host according to an embodiment of the inventive concept.

FIG. 7 is a flowchart illustrating a method 700 for operating an authentication platform to authenticate a user to an authentication host according to an embodiment of the inventive concept. The method of FIG. 7 will be described with reference to authentication system 100 of FIGS. 1 through 4, but it can also be used with other system configurations.

Referring to FIG. 7, the method begins by powering up authentication platform 120 (S701). This can be accomplished, for instance, by supplying power to integrated device 110 while preventing the supplied power from being applied to client device 125. The power is typically supplied by a portable source, such as a battery within integrated device 110. The power can also be supplied in other ways, such as a field generated by authentication host 105.

Next, the method determines whether the powering up of authentication platform 120 is an initial power up operation (S702). This can be determined, for instance, by operating control unit 315 to examine a stored flag indicating any prior power up operations.

Upon detecting an initial power up operation of authentication platform 120 (S702=Yes), the method supplies power to an integrated circuit (IC) constituting client device 125 (S703). Upon powering up, the IC generates an IC message, and authentication platform 120 captures the IC message (S704).

The IC message can comprise information used to authenticate a user to authentication host 105, or it can comprise an identifier message containing details regarding the communication speed, protocol, version number, or other client device specific details desired by the authentication host 105. The IC message is then stored (S705) for subsequent use as an initial message sent by authentication platform 120 (S707) on behalf of client device 125 during a power up operation. After the IC message is stored, the IC is powered down (S706) and a soft reset operation is performed on integrated device 110 (S723).

Upon determining that the power up operation of authentication platform 120 was not an initial power up operation (S702=No), authentication platform 120 transmits a previously captured IC message to authentication host 105 (S707). Thereafter, two sequences of operations are performed in parallel, beginning with steps S708 and S712. The first sequence of operations is used to implement the additional authentication mechanism of authentication platform 120, and the second sequence of operations is used to delay authentication host 105 until the additional authentication mechanism is satisfied.

In the first sequence, the method determines whether an additional authentication mechanism is required by authentication platform 120 (S708). Upon determining that such a mechanism is required (S708=Yes), power is supplied to authentication unit 310 (S709). Then, authentication unit 310 controls a process corresponding to the additional authentication mechanism (S710). For instance, authentication unit 310 can control the process by enabling user interface 405 to receive user input, comparing the user input with stored data, and generating an authentication result according to the comparison. During the process, authentication unit 310 determines whether the additional authentication mechanism has been satisfied (S711). If so (S711=Yes), the method continues to a step S717. Otherwise (S711=No), the method returns to step S710.

In the second sequence, authentication platform 120 receives a message from authentication host 105 (S712) and stores the received message (S713). This message is a response to the IC message transmitted to authentication host 105 in step S707. Next, authentication platform 120 requests additional time to respond to the message (S714) and then receives a response message regarding the request (S715). Thereafter, authentication platform 120 determines whether the additional authentication mechanism of authentication platform 120 has been satisfied (S716). If it has been satisfied (S716=Yes), the method proceeds to step S717. Otherwise (S716=No), it returns to step S714 to request additional time to respond.

Once the additional authentication mechanism of authentication platform 120 has been satisfied, authentication unit 310 is powered down (S717) and the IC of client device 125 is powered up (S718). Thereafter, authentication platform 120 captures a message from client device 125 (S719) and determines whether the captured message is the same as a message previously stored in authentication platform 120 (S720).

Upon determining that the message is the same (S720=Yes), authentication platform 120 transmits the message received from authentication host 105 in step S713 to client device 125 (S721). Then, authentication platform 120 performs a control operation to facilitate direct communication between client device 125 and authentication host 105 (S722). In other words, authentication platform 120 allows authentication host 105 and client device 125 to communicate as they would in the absence of authentication platform 120.

Upon determining that the message received from client device 125 is different from a previously stored message (S720=No), the method returns to step S705 to store the new message. It may be necessary to store the new message if, for example, client device 125 periodically generates new information to be transmitted to authentication host 105 for better security.

Figure 8:
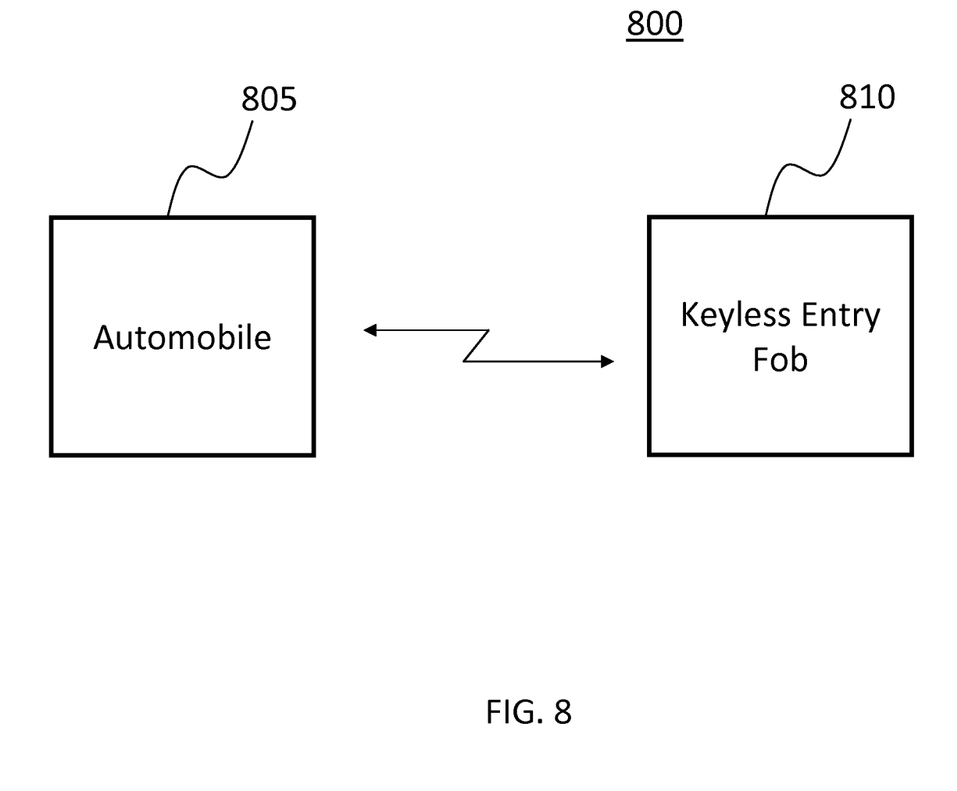
FIG. 8 is a conceptual diagram illustrating an authentication system for an automobile according to an embodiment of the inventive concept.

FIG. 8 is a conceptual diagram illustrating an authentication system 800 for an automobile according to an embodiment of the inventive concept. Authentication system 800 is one practical example of authentication system 100.

Referring to FIG. 8, authentication system 800 comprises an automobile 805 incorporating an authentication host, and a keyless entry fob 810 incorporating an integrated device.

When in proximity to automobile 805, fob 810 can be used to turn on the automobile's engine or unlock its doors. However, if the automobile's owner loses fob 810, an unauthorized user can potentially use it to steal automobile 805. Moreover, the owner may wish to perform certain functions, such as starting the engine to warm up the car, but not unlock the doors until user authentication is performed.

Accordingly, the client device within fob 810 can be coupled with an authentication platform to add a supplemental authentication mechanism. In certain embodiments, the authentication platform encapsulates the client device within fob 810 and monitors all communications between the client device and the outside world, including automobile 805. Then, where the client device transmits a message to start the engine, the authentication platform allows the message to be sent to the authentication host in automobile 805. However, where the client device transmits a message to unlock the doors, the authentication platform prevents the message from being transmitted until an additional authentication mechanism has been satisfied in fob 810. The additional authentication mechanism can be, for instance, a fingerprint authentication performed with a fingerprint sensor on fob 810. Upon successful authentication, the authentication platform transmits the message to the authentication host of automobile 805, and the authentication host controls automobile 805 to unlock the doors.

Figure 9:
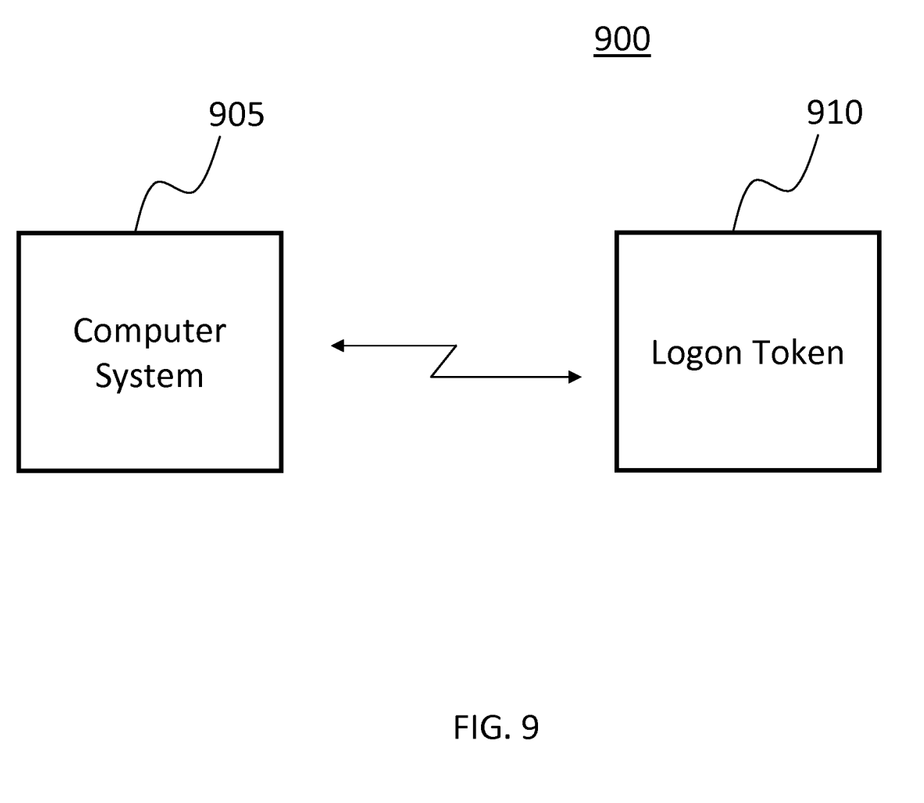
FIG. 9 is a conceptual diagram illustrating an authentication system for a computer terminal according to an embodiment of the inventive concept.

FIG. 9 is a conceptual diagram illustrating an authentication system 900 for a computer terminal according to an embodiment of the inventive concept. Authentication system 900 is another practical example of authentication system 100.

Referring to FIG. 9, authentication system 900 comprises a computer system 905 and a logon token 910. Logon token 910 can take various forms, such as a smartcard, USB stick, or other device containing information for logging on a user. In some embodiments, the mere presence of logon token 910 is sufficient to login to computer system 905. In other embodiments, computer system 905 requires an additional authentication mechanism, such as a PIN, pass code, or fingerprint.

To increase the security of computer system 905, logon token 910 can be supplemented by an authentication platform such as that described with reference to FIGS. 1 through 7. In one example, the authentication platform provides additional security by encapsulating a client device within logon token 910 and preventing the client device from being authenticated to computer system 905 until the authentication platform receives a recognized voice input through an associated microphone. Once the voice input is recognized by the authentication platform, the authentication platform allows the client device to communicate with computer system 905 to initiate further authentication steps.

Figure 10:
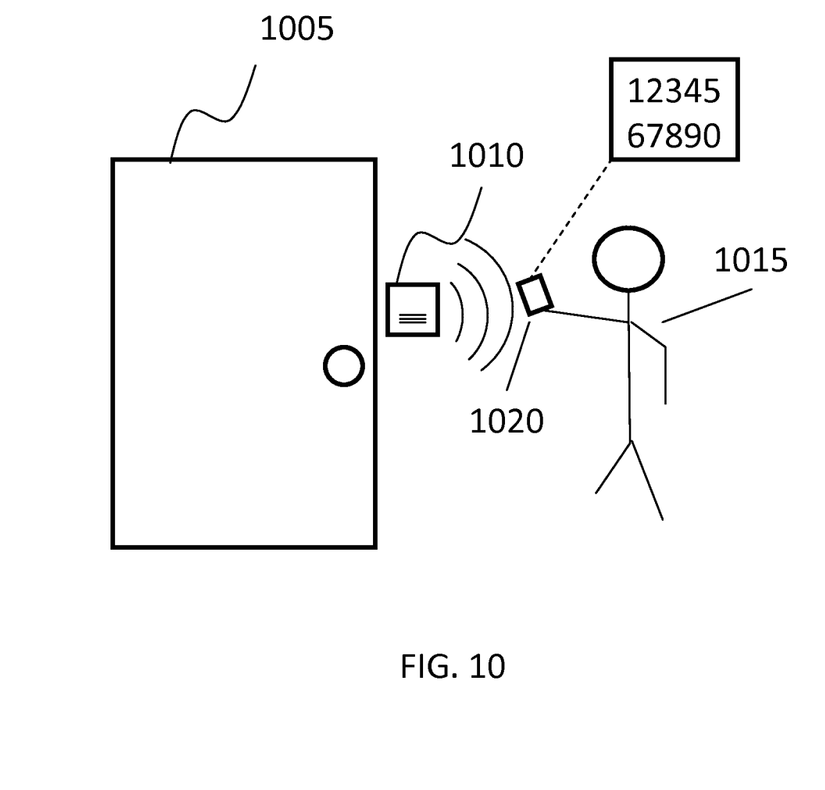
FIG. 10 is a conceptual diagram illustrating an authentication system for regulating passage through a door in accordance with an embodiment of the inventive concept.

FIG. 10 is a conceptual diagram illustrating an authentication system 1000 for regulating passage through a door 1005 in accordance with an embodiment of the inventive concept. The embodiment of FIG. 10 can be implemented as an extension to an existing door access control system using an entry card or other token.

Referring to FIG. 10, authentication system 1000 comprises a card reader 1010 and an access card 1020 issued to a user 1015. Card reader 1010 serves as an authentication host with respect to a client device contained in access card 1020. Access card 1020 comprises a client device and an authentication platform encapsulating the client device.

To use authentication system 1000, user 1015 presents access card 1020 to card reader 1010. Card reader 1010 performs an authentication operation on the client device of access card 1020 and unlocks door 1005 upon successful authentication. However, the authentication platform of access card 1020 prevents the client device from being authenticated to card reader 1010 before an additional authentication mechanism is performed by authentication platform.

As an example of the additional authentication mechanism, FIG. 10 shows a key pad on an enlarged view of access card 1020. The authentication platform requires user 1015 to enter a pass code as the additional authentication mechanism. This prevents an unauthorized user from passing through door 1005 in the event that user 1015 loses access card 1020.

The authentication platform provides the additional authentication mechanism without requiring any changes to the infrastructure of authentication system 1000. Accordingly, it can be used to upgrade or change the security of the locked door at relatively low cost.

In certain embodiments, access card 1020 contains a battery for powering the key pad and other components. Alternatively, access card 1020 can be powered by a field generated by card reader 1010.

In some embodiments, the authentication platform comprises a proximity sensor that operates in place of a proximity sensor of the client device. As access card 1020 approaches card reader 1010, the proximity sensor of the authentication platform senses a field generated by card reader 1010, and activates the authentication platform to receive power supplied by card reader 1010. As a result, the key pad becomes functional to allow authentication of user 1015. Once user 1015 enters the correct pass code into the key pad, the authentication platform powers the client device and allows it to be authenticated to card reader 1010.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. An authentication platform implemented in a portable authentication token and comprising:
   an authentication unit configured to receive input data from a user and to authenticate the user based on the input data;
   a control unit configured to communicate separately with a client device and an authentication host and to enable communication between the client device and the authentication host as a consequence of successful authentication of the user by the authentication unit;
   a first interface that communicates with the authentication host using a protocol associated with the client device so as to imitate communication of the client device; and
   a second interface that communicates with the client device using a protocol associated with the authentication host so as to imitate communication of the authentication host,
   wherein the client device is disposed in the token and stores trusted information, and the authentication host is disposed separate from the token and is configured to authenticate the client device based on the trusted information; and
   wherein the control unit communicates with the authentication host to request a time delay while the authentication unit authenticates the user.

2. The authentication platform of claim 1, wherein the control unit is further configured to capture and store a message generated by the client device, and to transmit the stored message to the authentication host as a consequence of the successful authentication of the user by the authentication unit.

3. The authentication platform of claim 2, wherein the message is generated by the client device upon powering up.

4. The authentication platform of claim 3, wherein, upon subsequent powering up of the client device, the authentication platform detects a subsequent message generated by the client device and replaces the stored message with the subsequent message upon determining that the subsequent message is different from the stored message.

5. The authentication platform of claim 1, further comprising:
   a proximity sensor configured to detect a field generated by the authentication host, and to activate the authentication unit upon detecting the field.

6. The authentication platform of claim 1, wherein enabling communication between the client device and the authentication host comprises allowing the client device to form a direct communication link with the authentication host.

7. The authentication platform of claim 1, wherein the input data comprises at least one of biometric information, a personal identification number, a motion pattern, a pressure measurement, or a button sequence.

8. The authentication platform of claim 1, wherein the client device comprises an integrated circuit storing information that has been registered with the authentication host.

9. The authentication platform of claim 1, wherein the portable authentication token comprises a fob-type or card-type device.

10. A method of operating an authentication system, comprising:
    receiving input data through a user interface of an integrated device comprising an authentication platform and a client device and implemented within a portable authentication token;
    operating the authentication platform to authenticate a user according to the received input data, and to enable communication between the client device and an authentication host as a consequence of authenticating the user; and
    transmitting a delay request to the authentication host while authentication of the user is pending;
    wherein the authentication platform comprises a control unit configured to communicate separately with the client device and the authentication host, a first interface that communicates with the authentication host using a protocol associated with the client device so as to imitate communication of the client device, and a second interface that communicates with the client device using a protocol associated with the authentication host so as to imitate communication of the authentication host, wherein the client device is disposed in the token and stores trusted information, and the authentication host is disposed separate from the token and is configured to authenticate the client device based on the trusted information.

11. The method of claim 10, wherein enabling communication between the client device and the authentication host comprises:
    capturing a message output by client device;
    transmitting the captured message to the authentication host using the protocol associated with the client device;
    receiving a message output by the authentication host; and
    transmitting the received message to the client device using the protocol associated with the authentication host.

12. The method of claim 10, further comprising:
    capturing a message generated by the client device in response to a power up operation; and
    transmitting the captured message to the authentication host as a consequence of authenticating the user.

13. The method of claim 10, wherein the delay request is configured to prevent the authentication host from timing out while awaiting a response from the client device.

14. The method of claim 10, further comprising:
    detecting proximity of the authentication platform to the authentication host;
    powering the authentication platform using a field generated by the authentication host.

15. The method of claim 10, wherein the input data comprises at least one of biometric information, a personal identification number, a motion pattern, a pressure measurement, or a button sequence.

16. An integrated device, comprising:
    a user interface configured to receive input data;
    an integrated circuit storing information for authenticating a user to an authentication host and configured to communicate with the authentication host; and
    an authentication platform comprising an authentication unit and control unit implemented separate from the integrated circuit and configured to capture a message generated by the integrated circuit upon powering up through a first communication interface, to power down the integrated circuit after capturing the message, to transmit the captured message to the authentication host while the integrated circuit is powered down through a second communication interface, to authenticate a user according to the input data, and to power up the integrated circuit and the authentication host after authenticating the user;

wherein the first communication interface communicates with the integrated circuit using a protocol associated with the authentication host so as to imitate communication of the authentication host, and the second communication interface communicates with the authentication host using a protocol associated with the integrated circuit so as to imitate communication of the integrated circuit;

wherein the authentication platform is further configured to receive a message generated by the authentication host in response to the captured message, and to transmit a delay request to the authentication host to prevent it from timing out while the user is authenticated to the integrated device.

* * * * *